(12) United States Patent
Sanchez

(10) Patent No.: US 10,086,453 B2
(45) Date of Patent: Oct. 2, 2018

(54) PROCESS FOR MANUFACTURING A CLOSED LOOP OF CUTTING WIRE

(71) Applicant: THERMOCOMPACT, Metz Tessy (FR)

(72) Inventor: Gérald Sanchez, Dingy Saint Clair (FR)

(73) Assignee: THERMOCOMPACT, Metz Tessy (FR)

( * ) Notice: Subject to any disclaimer, the term of this patent is extended or adjusted under 35 U.S.C. 154(b) by 138 days.

(21) Appl. No.: 15/128,610

(22) PCT Filed: Mar. 17, 2015

(86) PCT No.: PCT/FR2015/050652
§ 371 (c)(1),
(2) Date: Sep. 23, 2016

(87) PCT Pub. No.: WO2015/145024
PCT Pub. Date: Oct. 1, 2015

(65) Prior Publication Data
US 2018/0169778 A1      Jun. 21, 2018

(30) Foreign Application Priority Data
Mar. 24, 2014    (FR) ..................................... 14 52476

(51) Int. Cl.
*B23D 61/18*       (2006.01)
*B23D 65/00*       (2006.01)
(Continued)

(52) U.S. Cl.
CPC ....... *B23D 61/185* (2013.01); *B23D 57/0007* (2013.01); *B23D 65/00* (2013.01);
(Continued)

(58) Field of Classification Search
CPC .. B23D 61/185; B23D 57/0007; B28D 1/121; B28D 1/124; B23K 20/004; B23K 20/02–20/04; B21F 15/08
(Continued)

(56) References Cited

U.S. PATENT DOCUMENTS

| 6,065,462 A | 5/2000 | Hodsden et al. |
| 6,311,684 B1 | 11/2001 | Hodsden et al. |

(Continued)

FOREIGN PATENT DOCUMENTS

| CN | 101484597 | 7/2009 |
| CN | 202336665 | 7/2012 |

(Continued)

OTHER PUBLICATIONS

Dublier, "Cold Welding—A Cock-Simple English Invention May Greatly Simplify the Joining of Nonferrous Metals", Fortune, Sep. 1950, p. 1-6.

*Primary Examiner* — George Nguyen
(74) *Attorney, Agent, or Firm* — Occhiuti & Rohlicek LLP

(57) ABSTRACT

This process for manufacturing a closed loop of cutting wire comprises manufacturing a cutting wire comprising a central core extending continuously between two free ends. The central core having a tensile strength higher than 1400 MPa. The process includes welding the two free ends together to form the closed loop of cutting wire, in which: the manufacture of the cutting wire comprises making the central core from a material that is solid-state weldable. The welding is a solid-state welding operation comprising crushing, at a temperature below the melting point of the material of the central core, one of the free ends against the other of its free ends until the two ends have interpenetrated and formed a single uniform body of material.

15 Claims, 1 Drawing Sheet

(51) Int. Cl.
*B23K 20/02* (2006.01)
*B23D 57/00* (2006.01)
*B28D 1/12* (2006.01)

(52) U.S. Cl.
CPC .............. *B23K 20/02* (2013.01); *B28D 1/121* (2013.01); *B28D 1/124* (2013.01)

(58) Field of Classification Search
USPC ........ 125/21, 16.01; 140/111, 112; 83/651.1; 228/171, 136, 115, 234.1, 235.1, 235.2, 228/235.3
See application file for complete search history.

(56) References Cited

U.S. PATENT DOCUMENTS

| | | | |
|---|---|---|---|
| 9,352,404 B2* | 5/2016 | Song | B23D 65/00 |
| 9,862,041 B2* | 1/2018 | Liebelt | B23D 61/185 |
| 9,878,382 B2* | 1/2018 | Tian | B23D 61/185 |
| 9,902,044 B2* | 2/2018 | Puzemis | B24D 11/00 |
| 2002/0096551 A1* | 7/2002 | Reiber | B23K 20/004 228/4.5 |
| 2014/0254124 A1* | 9/2014 | Raje | H05K 13/0465 361/808 |

FOREIGN PATENT DOCUMENTS

| | | |
|---|---|---|
| FR | 88 121 | 4/1966 |
| GB | 892 874 | 4/1962 |
| WO | WO99/28075 | 6/1999 |
| WO | WO2008/007190 | 1/2008 |

* cited by examiner

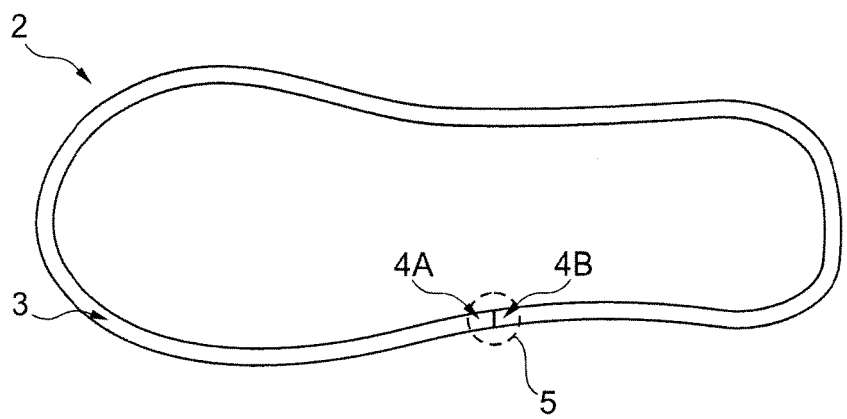
Fig. 1
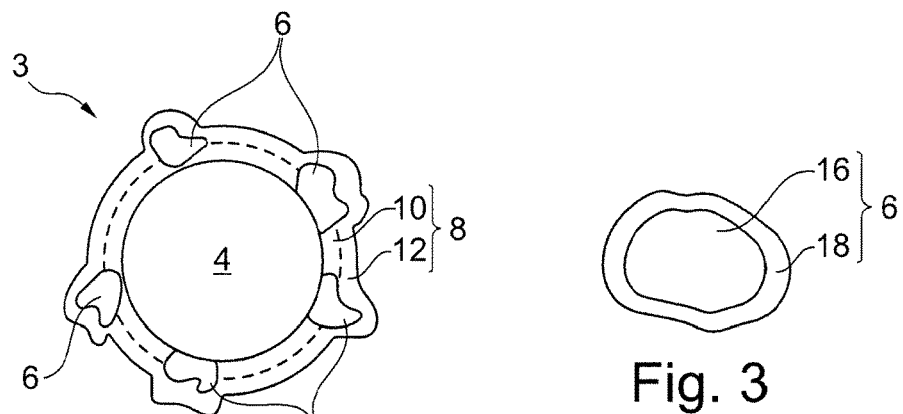
Fig. 2
Fig. 3
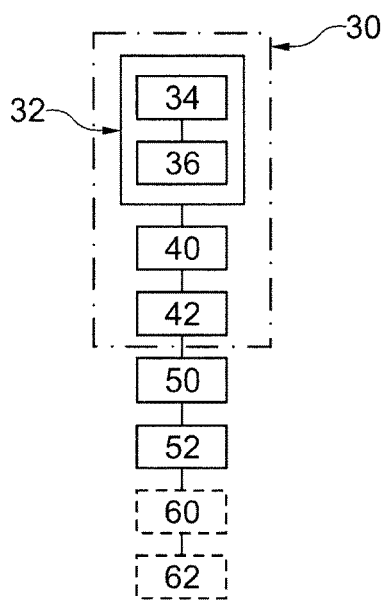
Fig. 4

PROCESS FOR MANUFACTURING A CLOSED LOOP OF CUTTING WIRE

RELATED APPLICATIONS

This is the national stage, under 35 USC 371, of PCT application PCT/FR2015/050652, filed Mar. 17, 2015, which claims the benefit of the Mar. 24, 2014 priority date of French Application 1452476, the content of which is herein incorporated by reference.

FIELD OF INVENTION

The invention relates to a process for manufacturing a closed loop of cutting wire and to a closed loop of cutting wire manufactured by this process.

BACKGROUND

Closed loops of cutting wire are used in machines for cutting ingots of hard material such as ingots made of silicon or other semiconductors. The wire cuts the ingot by wear or abrasion. To do this, the machine drives the closed loop to rotate. The velocity of the wire in its longitudinal direction is typically comprised between 5 m/s and 15 m/s. The wire is also held taut with a substantial force typically comprised between 10 N and 50 N and, preferably, between 30 N and 40 N.

The advantage of using a closed loop of cutting wire is that the wire always moves in the same direction and that it is not necessary to make provision to periodically change the movement direction of this wire. Known processes for manufacturing such a closed loop of cutting wire comprise:
  manufacturing a cutting wire comprising a central core extending continuously between two free ends, this central core having a tensile strength higher than 1400 MPa; and
  welding the two free ends together to form the closed loop of cutting wire.

Up to now, the weld used to form the loop was produced by heating, for example by means of a laser beam or an electric current, the ends of the cutting wire above the melting point of the central core. Next, the two heated ends were butted together. The molten metal of the central core present on each of these ends mixed and formed the weld after having cooled. Such a process is for example described in U.S. Pat. No. 6,311,684 B1.

It has been observed that during use in cutting machines of such closed loops, the loops thus produced have a tendency to break near the weld in the thermally affected zone. To remedy this problem, U.S. Pat. No. 6,311,684 B1 or patent application WO 99/28075 proposes to apply to the weld additional heat treatments at very precise temperatures. These additional heat treatments complicate the manufacture of the closed loop.

Prior art is also disclosed in GB 892 874 A and FR 88 121 E.

The invention aims to remedy this drawback by providing a simpler process for manufacturing a closed loop of cutting wire.

It therefore relates to such a process according to Claim 1.

Conventional welding processes heat the ends of the steel central core above its melting point. This heating modifies the mechanical properties of the central core locally. More precisely, this decreases its tensile strength and its fatigue strength. It is therefore for this reason that the loop generally breaks near the weld and that U.S. Pat. No. 6,311,684 B1 teaches carrying out additional heat treatments in order to restore the initial mechanical properties of the cutting wire even in the zone affected thermally by the welding.

SUMMARY OF INVENTION

In contrast, in the claimed process, the welding process used is a solid-state welding process that does not involve heating the central core above its melting point. Thus, during the solid-state welding, the mechanical properties of the central core are not modified and, in particular, the tensile strength of the central core is not decreased near the weld. It is thus not necessary to implement additional heat treatments in order to restore the mechanical properties of the wire at the weld and, in particular, to make the wire harder and/or less fragile at the weld.

The Applicants have also noted that solid-state welding is known to be applicable only to soft materials such as copper, i.e. materials that, when they take the form of a central core with a diameter comprised between 0.4 mm and 0.6 mm, have a tensile strength lower than 500 MPa. In addition, solid-state welding is known to be applied only to non-ferrous materials (see for example the teaching on the following Internet site: http://coldpressureweldinq.com/cms/index.php/en/faq#Q5). Thus, this teaching would dissuade those skilled in the art from any attempt to use this solid-state welding technique in the field of cutting wires. Specifically, central cores are made of materials that are as hard as possible and therefore normally from materials that are a priori incompatible with these solid-state welding techniques. However, the Applicants have also discovered that, surprisingly, these solid-state welding techniques yield satisfactory results even with cores made of hard materials, provided that the central core is made of a material capable of being solid-state welded.

Embodiments of this process may comprise one or more of the features of the dependent process claims.

These embodiments of the manufacturing process furthermore have the following advantages:
  carrying out the welding after the central core has been wire drawn simplifies the manufacture of the closed loop because it is then possible to manufacture the cutting wire from a central core extending continuously between its two free ends; and
  heating the closed loop in its entirety after the welding has been carried out allows the hardness of the cutting wire to be further increased over the entire length of the closed loop.

The invention also relates to a closed loop of cutting wire produced using the above manufacturing process.

Embodiments of this closed loop may comprise one or more of the features of the dependent claims relating to said closed loop of cutting wire.

The invention will be better understood on reading the following description, which is given merely by way of nonlimiting example and with reference to the drawings.

BRIEF DESCRIPTION OF THE DRAWINGS

FIG. 1 is a schematic illustration of a closed loop of cutting wire;

FIG. 2 is a schematic illustration, in cross section, of the cutting wire of the loop in FIG. 1;

FIG. 3 is a schematic illustration, in cross section, of an abrasive particle of the cutting wire in FIG. 2; and FIG. 4 is a flowchart of a process for manufacturing the closed loop in FIG. 1.

DETAILED DESCRIPTION

In these figures, the same references are used to designate the same elements.

In the rest of the description, features and functions well known to those skilled in the art are not described in detail.

In this description, when values of relative permeability are given for a magnetic material, they are for a frequency of 0.

FIG. 1 shows a closed loop 2 of a cutting wire 3. A cutting wire is intended to cut a hard material by wear or abrasion. Here, a material is considered to be hard if its microhardness on the Vickers scale is higher than 400 Hv50 or higher than or equal to 4 on the Mohs scale. In this description, Vickers microhardnesses are expressed for a load of 50 grams of force, i.e. for a force of 0.49 N. However, a person skilled in the art will know that it is necessary to adjust the load depending on the thickness of the material on which the measurements are made in order for the size of the Vickers indent to be smaller than the thickness of the material. Here, this cutting wire is intended for cutting single-crystal silicon or polysilicon or even sapphire or silicon carbide.

The wire 3 extends continuously from one end 4A to an opposite end 4B. The length of the wire 3 between its two ends 4A, 4B is generally greater than 20 cm or 1 m and typically greater than or equal to 2 m or 3 m. Generally, the length of the wire 3 is less than 10 m or 5 m.

To form the loop 2, the ends 4A and 4B are mechanically connected to each other with no degree of freedom by a weld 5.

FIG. 2 shows in greater detail a cross section of the wire 3. The wire 3 comprises a central core 4 to the periphery of which abrasive particles 6 are fastened, said particles 6 being held on the central core by a binder 8.

Typically, the central core 4 takes the form of a single wire having a tensile strength higher than 1200 MPa or 1400 MPa and, preferably, higher than 2000 or 3000 MPa. Generally, the tensile strength of the core 4 is lower than 5000 MPa.

The elongation at break of the core 4 is greater than 1% and, preferably, greater than 2%. In contrast, the elongation at break of the core 4 must not be too great and, for example, must remain below 10% or 5%. The elongation at break here is the amount by which the length of the core 4 can be increased before the latter breaks.

In this embodiment, the core 4 has a circular cross section. For example, the diameter of the core 4 is comprised between 70 µm and 1 mm. The diameter of the core 4 often depends on the material that it is desired to cut. For example, the diameter of the core 4 is comprised between 200 µm and 450 µm or 200 µm and 1 mm to cut silicon ingots whereas it is comprised between 70 µm and 100 µm or between 70 µm and 200 µm to cut silicon wafers. In this embodiment, the core 4 is made of an electrically conductive material. A material is considered to be electrically conductive if its resistivity is lower than $10^{-5}$ Ω·m at 20° C.

The core 4 is also made of a solid-state weldable material. Solid-state welding is well known. It includes welding techniques where the temperature of the core 4 remains below the melting point of the material of the core. Typically, the welding temperature is below 0.9 $T_m$ and, preferably, below 0.5 $T_m$ or 0.25 $T_m$ or 0.15 $T_m$, where $T_m$ is the melting point of the material of the central core. For example, in the case of cold welding, the welding temperature is below 0.25 $T_m$ or 0.15 $T_m$, i.e. typically below 50° C. or 100° C.

During the solid-state welding, the weld is produced without applying any external material to the ends to be welded. Solid-state welding is typically carried out by violently crushing one of the free ends 4A against the other free end 4B. This crushing is carried out with enough pressure that, at the point of impact, the materials of the two ends 4A and 4B interpenetrate to form a single uniform body of material. Typically, the pressure is considered to be high enough if the parameter Y=(S1−So)/S1 is higher than 0.5 and, preferably, than 0.7, where:

So is the cross section of the core 4 before the solid-state welding has been carried out; and S1 is the cross section of the core 4, at the weld 5, after the solid-state welding has been carried out.

This generally corresponds to a pressure in MPa higher than Hv×5 and, preferably, than Hv×10, where Hv is the microhardness of the material of the core 4 expressed on the Vickers scale for a load of 50 grams of force. For most solid-state weldable materials, the pressure at the point of impact is higher than 1000 MPa and, preferably, higher than 4000 MPa.

After the solid-state welding has been carried out, it is impossible to discern, even in a longitudinal cross section through the weld observed under a microscope, an interface that separates, on the one hand, the material that, before the welding was carried out, belonged to the end 4A and, on the other hand, the material that, before the welding was carried out, belonged to the other end 4B. Here, the welding process is a cold welding process. Cold welding is carried out using a pressure welding machine. This machine is well known and will not be described in greater detail here. It is for example a question of the machine sold under the reference BM30 by P.W.M (Pressure Welding Machines). It possesses through a compartmentalized die two clamps that each clamp a respective end of the central core. It also possesses a mechanism of hydraulic cylinders that allows the clamps to be brought closer to each other until they make contact with a substantial force. This force is enough to crush against each other the ends of the core 4 clamped and held by these clamps. Excess metal is expelled laterally, and this action is repeated as many times as is required to achieve a pressure level high enough to create the atomic bond between the two ends 4A, 4B.

Not all materials are solid-state weldable. For example, solid-state weldable materials are often, but not always, materials that contain no carbon or that contain very little carbon, i.e. less than 0.2 wt % or 0.4 wt % and, typically, less than 0.04 wt % or 0.02 wt % carbon.

Lastly, in this particular embodiment, the core 4 is generally made of a magnetic material the relative permeability of which is higher than 50 and, preferably, higher than 100 or 200.

For example, here, the material used to make the core 4 is an austenitic stainless steel. Typically, stainless steels are an alloy of iron and carbon in addition containing at least 10 wt % chromium and, typically, more than 30 wt % or 50 wt % iron. Specifically, it is the chromium that protects the steel from oxidation. It forms a protective $Cr_2O_3$ oxide on the surface of the steel. It also generally comprises less than 1 wt % or 0.5 wt % of ceramic particles such as $Fe_3C$ or $Cr_{23}C_6$. Preferably, the austenitic stainless steel has a face-centred cubic crystal structure or a γ (gamma) iron form. Suitable austenitic stainless steels are typically chosen from alloys containing iron and nickel in the proportions indicated above, and less than 26 wt % chromium and less than 0.2 wt % carbon.

In the case of the most commonplace stainless steels, such as 304, 316, 316L and 321 stainless steels, the "gamma" structure is obtained by adding at least 6 wt % and, often, at least 10 wt % nickel to the steel. This is why these steels are widely referred to as "18-10" steels (18% chromium and 10% nickel). For example, here the stainless steel is 316L steel. Materials other than stainless steel, such as nickel-chromium alloys, may also be used. For example, it may be a question of Inconel® X750. Inconel X750 is a nickel-chromium alloy containing:

70 wt % nickel and cobalt;
14 wt % chromium;
5 to 9 wt % iron; and
2 to 2.5 wt % titanium.

Other possible materials are homogeneous alpha-phase materials. The homogeneous alpha phase is the alpha phase of the phase diagram of this material. These materials may be homogeneous alpha-phase alloys and, in particular, homogeneous alpha-phase nickel-chromium alloys.

The weight per unit length m of the core 4 is, for example, comprised between 10 mg/m and 500 mg/m and, preferably, between 50 mg/m and 200 mg/m.

The abrasive particles 6 form teeth on the surface of the core 4, which will erode the material to be cut. These abrasive particles must therefore be harder than the material to be cut.

The diameter of these particles 6 is comprised between 1 μm and 500 μm and is smaller than one third of the diameter of the core 4. Here, in this embodiment, the diameter of the particles 6 is comprised between 10 and 22 μm for a core of 0.12 mm diameter. When these particles 6 are not spheres, the diameter corresponds to the largest hydraulic diameter of these particles.

The function of the binder 8 is to keep the abrasive particles 6 fastened with no degree of freedom to the core 4.

Preferably, the binder 8 is a metal binder because these binders are harder than resins and therefore allow the abrasive particles to be more effectively held on the core 4. Here, the binder is nickel or a nickel alloy.

In this embodiment, the binder 8 is deposited in two successive layers 10 and 12. The layer 10 is small in thickness. For example, it is thinner than one quarter of the average diameter of the abrasive particles. This layer 10 just allows the abrasive particles 6 to be weakly fastened to the central core.

The layer 12 has a larger thickness. For example, the thickness of the layer 12, in the radial direction, is comprised between 0.25 and 0.5 times the average diameter of the abrasive particles. The thickness of the layer 12 is generally smaller than or equal to 0.5 times the average diameter of the abrasive particles 6. The thickness of the layer 12 however conventionally remains smaller than or equal to the average diameter of the abrasive particles.

This layer 12 makes it possible to prevent abrasive particles 6 from being torn from the core when the wire 3 is used to cut a part. The sum of the thicknesses of the layers 10 and 12 is generally lower than 0.7 times the average diameter of the abrasive particles 6.

FIG. 3 shows in more detail one abrasive particle 6. Each abrasive particle 6 comprises an abrasive grain 16 made of a material that is harder than the material to be sawn. For example, the hardness of the abrasive grain 16 is higher than 430 Hv50 on the Vickers scale and, preferably, higher than or equal to 1000 Hv50. On the Mohs scale, the hardness of the grains 16 is higher than 7 or 8. For example, the grains 16 are diamond grains.

In this particular embodiment, each grain 16 is covered with a coating 18 made of a magnetic material the relative permeability of which is higher than or equal to 50 and, preferably, higher than or equal to 100. The magnetic material used is for example a ferromagnetic or ferrimagnetic material. Preferably, the material is also an electrically conductive material in order to make it easier to fasten the particles 6 with the binder 8 to the core 4. For example, the material used is preferably a ferromagnetic material comprising one of the following elements: iron, cobalt, nickel or a samarium-cobalt alloy or neodymium.

The coating 18 is thick enough for the volume of magnetic material in the abrasive particle 6 to allow this particle to be picked up when it is placed in an induced magnetic field gradient of 30 T/m and, preferably, of 10 T/m. Typically, to do this, the volume of the magnetic material represents more than 1% or 5% of the volume of the abrasive particle 6. For example, its thickness is comprised between 0.5 and 100% of the diameter of the grain 16 of the abrasive particle 6 and, preferably, between 2 and 50% of the diameter of the grain 16 of the abrasive particle 6.

The thickness is generally larger than 0.05 μm and, preferably, larger than 1 μm in order to obtain a coating 18 covering more than 90% of the exterior surface of the grain 16.

By way of example, the coating 18 is here made of nickel. The thickness of the coating 18 is chosen such that it represents more than 10 wt % and, preferably, less than 56 wt % of the particle 6.

The manufacture of the loop 2 will now be described with reference to the process in FIG. 4.

The process starts with a phase 30 of manufacturing the cutting wire 3. This phase 30 starts with a step 32 of making the core 4 from a material that is solid-state weldable, such as one of those described above.

Here, step 32 consists in providing, in an operation 34, the core 4 made of this material, having an initial diameter $\phi_{ini}$. Typically, the diameter $\phi_{ini}$ is larger than or equal to 1.1 times or 1.2 times the final diameter $\phi_{final}$ desired for the core 4. For example, here, the diameter $\phi_{final}$ desired is assumed to be equal to 0.5 mm. Under these conditions, the diameter $\phi_{ini}$ of the core 4 is chosen to be larger than or equal to 0.6 mm. Here, the diameter $\phi_{ini}$ is equal to 0.7 mm.

At this stage, the tensile strength of the core 4 is, preferably, higher than 500 MPa and, advantageously, higher than 700 MPa or 800 MPa. However, the tensile strength is also generally lower than the tensile strength desired for the loop 2, i.e. lower than 1200 MPa or than 1400 MPa. In addition, in the operation 34, the elongation at break of the core 4 is generally very much greater than 10% or 5%. For example, the elongation at break of the core 4 is at this stage greater than 20% or 30%.

Next, in an operation 36, the core 4 is wire drawn in order to decrease its diameter to the desired diameter $\phi_{final}$. In the operation 36, the core 4 is for example drawn in order to decrease its diameter. This operation work hardens the core 4 and therefore hardens the material of the core 4. Thus, after the operation 36, the diameter of the core 4 is equal to the diameter $\phi_{final}$. In addition, because of the work hardening, the tensile strength of the core 4 now exceeds 1400 MPa or 1500 MPa. At this stage, the elongation at break of the core 4 has dropped below 10% or 5%.

After step 32, a step 40 of fastening, with no degree of freedom, abrasive particles 6 to the core 4 produced beforehand is carried out.

Here, the abrasive particles 6 are deposited by electrolysis on the core 4. For this purpose, one of the techniques described in patent application FR 2 988 628 is used. Here, these techniques are implemented not on a carbon steel but on a core made of a solid-state weldable material. Thus, depending on the nature of the material of the core 4, it may be necessary to deposit a tie layer on the core 4 before depositing the binder 8, in order to guarantee a good mechanical bond between the binder 8 and the core 4. Production of such a tie layer is well known in the art and therefore is not described in detail here.

After step 40, the cutting wire 3 comprising the core 4 to which abrasive particles 6 are fastened is obtained. The ends 4A, 4B are free. If, at this stage, the wire 3 is too long, it is then cut to the length desired for the loop 2.

In a step 42, at each free end 4A and 4B, the binder 8 and the abrasive particles 6 are removed in order to expose the core 4. Here, the ends 4A and 4B are stripped over a length of 2 to 5 mm starting from the free end.

The manufacture of the cutting wire ends and then a step 50 of welding the free ends 4A and 4B together in order to form the loop 2 is carried out. For this purpose, a pressure welding machine is used. More precisely, the clamps of the pressure welding machine are brought to bear directly against the stripped portions of the core 4. Next, the machine is actuated in order to bring the clamps closer to each other. The ends 4A and 4B are then crushed against each other with a high enough pressure that the materials of these two ends interpenetrate with each other and form a single uniform body of material.

When the ends 4A and 4B are crushed against each other, some of the material of these ends flows radially towards the exterior of the weld and forms flash. In the case where the material of the core 4 is an austenitic stainless steel, the $Cr_2O_3$ oxide layer is expelled towards the exterior out of the weld zone. This promotes solid-state welding because the $Cr_2O_3$ oxide is an oxide that is more like a ceramic that is not cold-weldable than a cold-weldable metal.

The expulsion towards the exterior of some of the material of the core 4 in step 50 also has the collateral effect of work hardening i.e. of hardening by deformation, the zone affected by the weld. This zone becomes more work hardened and therefore harder than the rest of the core 4 without there being any need to apply an additional treatment to achieve this. In addition, as this hardening is obtained by work hardening, and not by tempering, the weld 5 obtained is harder than the rest of the core 4 while remaining ductile, i.e. non-fragile. In particular, the core 4 may be bent level with the weld 5 without breaking it. Typically, the weld remains substantially as ductile as the rest of the core 4. For example, the weld 5 is at least as ductile as the rest of the core 4. Thus, at this stage, it is possible to distinguish the weld 5 relative to other types of welds, in that it is both harder than the rest of the core 4 and, at the same time, non-fragile. By comparison, a hot weld, i.e. a weld obtained by melting the ends 4A and 4B, is both more fragile than the rest of the core that was not heated, and less hard than the rest of the core.

Thus, once the weld has been produced, in a step 52, the weld 5 is deflashed in order to remove the flash that was formed. Thus, the diameter of the core 4, at the weld 5, is brought to the desired diameter $\phi_{final}$.

Next, in the case where the core 4 is made of a material the hardness of which increases in response to a heat treatment, such as Inconel® for example, in a step 60 this heat treatment is optionally carried out on loop 2 in its entirety. This heat treatment thus allows the hardness of the weld 5 and the rest of the wire 3 to be equalized. During this heat treatment, the loop 2 is heated. However, during this heating the temperature remains below the melting point $T_m$ of the core 4. For example, in the case where the core 4 is made of Inconel X750, the loop 2 is heated to 850° C. for 4 h.

Next, again optionally, in a step 62, it is also possible to refasten abrasive particles 6 to the stripped portions of the core 4 located level with the weld 5. For example, step 62 is carried out in the same way as step 40 except that the abrasive particles are deposited only locally on the stripped portions of the core 4.

Many other embodiments are possible. For example, as a variant, the abrasive particles are fastened directly to the central core without using a binder. For this purpose, for example, the abrasive particles are embedded in the central core. As another variant, the abrasive particles 6 and the binder 8 are omitted. In this case, the abrasive particles are free and it is the friction of the central core 4 with particles directly transported onto the ingot to be cut that allows the ingot to be cut. The latter process is conventionally called a "three-body cut", in contrast to the preceding processes which are referred to as "two-body cuts".

Other processes for manufacturing the wire 3 are possible. For example, another process is described in patent application EP 2 428 317. To manufacture the wire 3, it is also possible to use techniques that do not use a magnetic field to attract the abrasive particles onto the central core. When such a process is implemented, it is then not necessary for the central core and/or the abrasive particles 6 to be produced from a magnetized or magnetizable material. The abrasive particles may be fastened to the central core by other means not involving electrolysis. If electrolysis is not employed, it is then not necessary for the central core to be made from an electrically conductive material.

In another embodiment, the coating 18 of the abrasive particles is replaced by a simply metal coating that is not necessarily made of a magnetic material. Specifically, such a metal coating increases the bonding force between the particles and the binder. For example, the coating is made of titanium.

Step 42, which consists in stripping the ends of the cutting wire, may be omitted. In this case, the clamps of the pressure welding machine bear directly against the abrasive particles 6 and the binder 8. Next, when the ends 4A and 4B are crushed against each other, the binder 8 and the abrasive particles 6 are ejected towards the exterior of the weld out of the zone in which the ends of the core 4 interpenetrate. Therefore, the fact that the binder 8 or abrasive particles 6 have not been removed in no way hinders the production of the weld 5. In particular, no abrasive particles and no bits of binder 8 are left trapped between the two ends 4A and 4B after the solid-state welding operation.

Solid-state welding techniques other than cold welding may be used. For example, it is possible to use the magnetic pulse welding technique or the explosion welding technique. In these processes, the two ends are crushed against each other by violently projecting one of these ends against the other. In the case of magnetic pulse welding, electromagnetic pulses are used to accelerate one of the ends violently towards the other. Typically, at the moment of impact of the ends against each other, one of these ends may be moving with a velocity higher than 300 m/s. In the explosion welding technique, it is the explosion of an explosive charge that causes one of the ends to accelerate towards the other.

The welding step 50 may also be carried out at other moments. For example, the welding 50 may be carried out after the wire-drawing operation 36 and before the step 40 of fastening the abrasive particles. The welding step 50 may also be carried out before the wire-drawing operation 36, i.e. at a stage when the hardness of the core 4 has not yet been increased. In contrast, the wire-drawing operation 36 and the operation for fastening the abrasive particles must then be carried out on a closed loop instead of a rectilinear wire segment.

The invention claimed is:

1. A process for manufacturing a closed loop of cutting wire, the process comprising manufacturing a cutting wire, wherein the cutting wire comprises first and second free ends and a central core that extends continuously between the first and second free ends, wherein the central core has a tensile strength that exceeds 1400 MPa and welding the first and second free ends together to form the closed loop of cutting wire, wherein manufacturing the cutting wire comprises making the central core from a material that is solid-state weldable and wherein welding the first and second free ends comprises carryout out a solid-state welding operation, wherein the solid-state welding operation comprises, at a temperature below the melting point of the material of the central core, crushing the first free end against the second free end until the first and second free ends interpenetrate and form a single uniform body of material.

2. The process of claim 1, wherein manufacturing the cutting wire comprises wire drawing the central core to decrease its diameter and increase its hardness by work hardening to achieve a tensile strength that exceeds 1400 MPa and, after having done so, welding the first and second free ends of the wire-drawn central core together to form the closed loop.

3. The process of claim 1, further comprising, after the welding step, heating the closed loop in its entirety to a temperature below the melting point of the material of the central core.

4. The process of claim 1, further comprising removing a flash produced during solid-state welding.

5. The process of claim 1, wherein manufacturing the wire further comprises fastening abrasive particles to the central core.

6. A manufacture comprising a closed loop of cutting wire having a central core having a tensile strength that exceeds 1400 MPa and that extended between first and second free ends of said cutting wire, said first and second free ends having been welded together by a solid-state welding operation in which, at a temperature below the melting point of the central core, the first and second free ends were crushed against each other, wherein the closed loop comprises a weld that connects the first and second free ends together, wherein the central core is made of a solid-state weldable material, wherein the weld is a solid-state weld that forms only a single uniform body of material with the central core, and wherein the solid-state weld is the result of interpenetration of the first and second ends with each other.

7. The manufacture of claim 6, wherein the central core is made of a material having a face-centered cubic crystal structure.

8. The manufacture of claim 7, wherein the central core is made of austenitic stainless steel.

9. The manufacture of claim 8, wherein the central core is made of an iron-nickel alloy, wherein the iron-nickel alloy comprises less than 26% by weight of chromium and less than 0.2% by weight of carbon.

10. The manufacture of claim 6, wherein the central core is made of a nickel-chromium alloy containing at least 6% by weight of nickel.

11. The manufacture of claim 6, wherein the central core is made of an alloy comprising 70% by weight of nickel and cobalt, 14% % by weight of chromium, between 5% to 9% by weight of iron, and between 2% to 2.5% by weight of titanium.

12. The manufacture of claim 6, wherein the central core is made of a material that, when formed into a wire having a diameter that is between 0.2 millimeters and 1 millimeter, has a tensile strength that exceeds 1400 MPa.

13. The manufacture of claim 6, wherein further comprising abrasive particles fastened with no degree of freedom to the central core.

14. The manufacture of claim 6, wherein the central core is made of a material having a homogeneous gamma iron phase.

15. The manufacture of claim 6, wherein the central core is made of a material having a homogeneous alpha phase.

* * * * *